May 6, 1952 J. G. LEE 2,595,363
HINGED FINS FOR PROVIDING DIRECTIONAL CONTROL
AND STABILITY IN TAILLESS AIRPLANES
Filed June 30, 1948
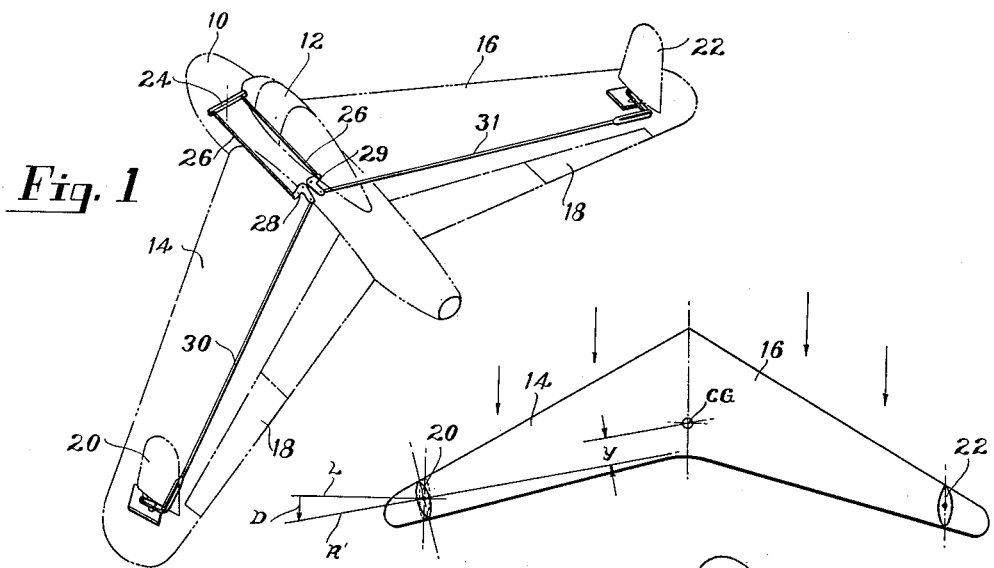
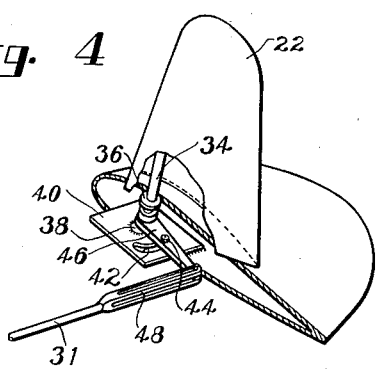
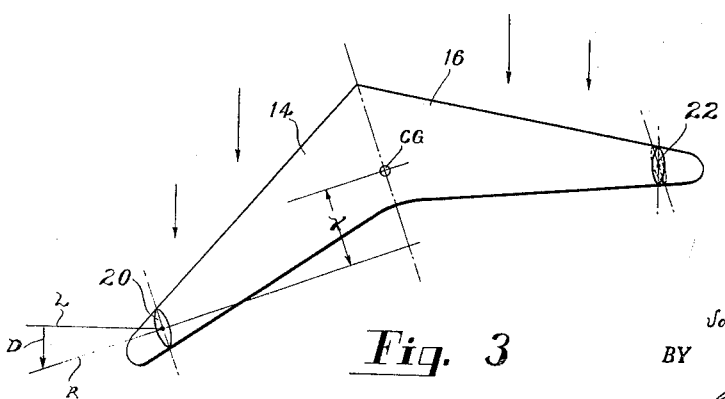
INVENTOR.
John G. Lee
BY
M. B. Tasker
ATTORNEY Patented May 6, 1952

2,595,363

UNITED STATES PATENT OFFICE 2,595,363

HINGED FINS FOR PROVIDING DIRECTIONAL CONTROL AND STABILITY IN TAILLESS AIRPLANES

John G. Lee, Farmington, Conn., assignor to United Aircraft Corporation, East Hartford, Conn., a corporation of Delaware Application June 30, 1948, Serial No. 36,118

7 Claims. (Cl. 244—87)

This invention relates to improvements in tailless airplanes having moderate or considerable sweep-back and has as one of its objects provision of improved means for obtaining inherent directional stability combined with positive directional control in airplanes of this type.

More specifically it is an object of this invention to provide means operative upon a deflection of the airplane in yaw to set up restoring moments about the center of gravity which will return the airplane to its original direction of flight and at the same time to provide means for positively controlling the direction of the airplane.

A further object of the invention is generally to improve the directional stability and control of tailless airplanes having a sweep-back wing configuration.

These and other objects of the invention will become apparent from the following detailed description of the accompanying drawings which illustrate one practical embodiment of the invention.

In these drawings,

Fig. 1 is a perspective view of a tailless airplane having sharply swept back wings and embodying the invention, the airplane being shown in phantom;

Fig. 2 is an enlarged detail of a wing tip of the airplane of Fig. 1;

Fig. 3 is a diagrammatic view of a wing embodying the invention and illustrating the forces acting to restore the wing to its normal direction of flight following the yawing movement;

Fig. 4 is a diagrammatic view of a wing embodying the invention and illustrating the forces acting to control the direction of the airplane.

This invention is of particular value in tailless airplanes having sharply swept-back wings although it is not limited to use in that particular type of aircraft. As herein shown, the invention is embodied in a tailless jet propelled airplane comprising a fuselage 10 having a pilot compartment 12 and sharply swept-back wings 14 and 16 provided with the usual trailing edge ailerons 18.

In accordance with the present invention, vertical fins or rudders 20 and 22 of airfoil cross section are pivotally mounted on the upper surface of the wings 14 and 16, respectively, adjacent the tips thereof. These fins are normally free floating but can be positively controlled by the pilot's rudder bar control 24 interconnected therewith, by the links 26, the bell cranks 28 and 29, and the push-pull rods 30 and 31, respectively. The linkages shown are so arranged that when the pilot pushes right rudder on the bar 24, the fin 20 will have its trailing portion moved inboard. Similarly when the pilot applies pressure to left side of the bar 24, the right-hand fin 22 will have its trailing edge moved inboard.

As more clearly shown in Fig. 2, the fins are pivoted for free floating movement about vertical axes located slightly forward of their aerodynamic centers and are of symmetrical airfoil shape so that virtually no induced drag other than possibly skin friction will be present when the fins are aligned with the relative wind. The axes of the fins are located to the rear of a transverse line through the center of gravity of the airplane so as to produce moments about the center of gravity in the manner described hereinafter. To this end each of the fins carries a vertical shaft 34 to which it is rigidly secured and which is mounted in bearings 36 and 38 carried by the upper and lower wing surfaces internally of the wing, these bearings in the construction illustrated being welded to the inner wing surfaces.

Considering specifically the right-hand fin 22, the lower bearing 38 is provided with an integral plate 40 which is welded at its periphery to the lower wing surface. This plate 40 is provided with an arcuate slot 42, aft of the bearing 38, which is struck about the axis of pivotation of the fin and is adapted to receive a depending pin 44 on the arm 46. The arm 46 is rigidly secured to the shaft 34 at its forward end and swings with the fin as the latter pivots in its bearing. The aft or free end of the arm 46 is slidably connected to a slotted fitting 48 on the end of the push-pull rod 31 which is interconnected with the pilot's rudder bar. The operation of this slotted fitting in connection with positive control of the fin will be more fully described hereinafter.

The length of the slot 42 and its location to the pivot rod 44 is such to permit the fin to occupy a position in which the chord line is substantially parallel to the longitudinal direction of the airplane when the pin 44 is in the right-hand end of the slot as shown in Fig. 2; and the slot extends inboard toward the center line of the airplane so as to permit the fin to move through a considerable angular distance before it is arrested by engagement of the pin 44 with the inboard end of the slot 42. The length of the slot 42, in addition, is such that the fin will be prevented from being moved to a stalling angle in relation to the relative wind. In Fig. 2 the right-hand fin 22 has been shown in detail but it will be understood that the fin 20 on the left-hand wing 14 is similarly mounted for movement between a position in which its chord line is parallel with the longitudinal center line of the airplane wherein its pin 44 is engaged with the outboard end of its cooperating slot 42 and an inwardly deflected position similar to that permitted fin 22 in Fig. 2.

The free floating operation of the fins 20 and 22 will best be understood from the reference to Fig. 3 where wings 14 and 16 are shown diagrammatically with the fins 20 and 22 in the positions assumed by these fins following a deflection of the airplane to the left in yaw. It will be noted that while the airplane has yawed to the left, right-hand fin 22 has remained in alignment with the incoming air stream, as permitted by the slotted fitting 48 and the slot 42 which allow pin 44 and the arm 46 to freely move inboard. The left-hand fin 20, however, has moved bodily with the airplane into a position in which its chord line lies at an acute angle to the direction of flight (or relative wind), since its pin 44 is in the outboard end of its cooperating slot 42 thus preventing any further outboard movement of the fin trailing portion.

In this position of the parts it will be evident that the oncoming air stream flowing past the streamlined fin 22 produces no appreciable affect on the airplane; but due to the angle of attack of fin 20 the air stream produces lift and drag forces on the latter as indicated by the vectors in Fig. 3. The resultant force R acts on the airplane through a moment arm X, measured from the center of gravity of the wing, thereby producing a restoring movement about the center of gravity tending to return the airplane to its original position in which it is symmetrical with the direction of flight.

It will be obvious that a similar deflection of the airplane to the right in yaw will result in counterclockwise movement of the fin 20 relative to the wing 14 into a position in which it is longitudinally aligned with the air stream while the fin 22, being unable to move in a counterclockwise direction due to the fact its stop pin 44 is already in the outboard end of the slot 42, will remain in the normal position relative to the wing so that a restoring moment about the center of gravity of the airplane is set up tending to move the airplane counterclockwise about its center of gravity until the aircraft fore and aft center line is aligned with the direction of flight.

As a practical matter, the slots 42 for the stop pins 44 are designed so that when the pins 44 engage the outboard ends of the slots in normal forward flight, the trailing edge of fins 20 and 22 are very slightly inwardly directed so that the normal forces acting on these fins as the airplane moves in directionally stable flight hold the fins firmly against the outboard ends of the slots. It is to be understood that the fins 20 are so arranged and the slot 42 is of such dimension that a stalling angle of attack is never reached.

The free floating fin mechanism described thus far for producing inherent stability in airplanes of this type is fully disclosed and claimed in Patent Application Serial No. 629,885, filed November 20, 1945 which matured into Patent No. 2,539,357 issued January 23, 1951.

While the fins 20 and 22 are free floating to produce inherent stability, a novel means has also been provided to manually control either the fin 20 or the fin 22 in order to directionally control the aircraft. Thus it is evident that should the pilot wish to make a right turn for example, he would push the right-hand side of the control bar 24 forward, thereby rotating the bell crank 28 counterclockwise and moving the push-pull rod 30 inboard. At the same time the bell crank 29 will also be rotated counterclockwise thereby moving the push-pull rod 31 outboard. Since the aft end of the arm 46 of the fin 20 is situated in the extreme outboard end of the slotted fitting 48, the arm 46 and the fin 20 will be moved inboard so that the fin 20 will be affected by the oncoming wind as diagrammatically shown in Fig. 4. With the fin 20 in the full line position shown in Fig. 4 the oncoming wind will cause the resultant lift force R' which acting through moment arm Y about the center of gravity of the airplane will cause the latter to turn to the right. At the same time that the fin 20 is moved inboard, the fin 22 on the other wing tip will still be permitted to float freely in the air stream since the arm 46 of this fin will merely slide within its cooperating slotted fitting 48. This lost motion connection between the arms 46 and the slotted fittings 48 permits positive inboard movement of either fin to provide directional control while permitting the other fin to retain its free floating characteristic.

Thus it is evident as a result of this invention that inherent directional stability is imparted to the airplane by virtue of the free floating inboard movement of the fins and at the same time directional control can be maintained by the pilot as a result of the novel cooperating control mechanism which permits selective movement of the control surfaces or fins.

Further, as a result of this invention the lift forces acting on an airfoil shaped control surface are utilized to provide inherent directional stability and directional control in tailless airplane having sharply swept-back wings.

While the invention has been illustrated in connection with a tailless airplane, it will be evident that the principles involved are applicable to airplanes of other types, for example, all-wing, low aspect ratio airplanes, and that various changes can be made in the parts without departing from the scope of the invention.

What it is desired to secure by Letters Patent is:

1. In an airplane having swept-back wing surfaces on opposite sides of a central longitudinal plane, control surfaces of substantially symmetrical airfoil shape pivotally mounted on said wing surfaces for limited free floating movement about axes located to the rear of a transverse line through the center of gravity of the airplane and upstanding from said wing surfaces, means for imparting inherent directional stability to the airplane in yaw including said control surfaces and stops for limiting the outboard movement of the trailing portions of said control surfaces beyond positions in which the latter lie substantially parallel with said plane while permitting inboard movement thereof about said axes, and means for positively moving either of said control surfaces inboard of its normal position parallel with said plane to produce controlling lift forces thereon including pilot operated mechanism movable in two directions and connected with said surfaces, said pilot operated mechanism including operative connections to said control surfaces for positively moving one of said surfaces inboard immediately upon movement of said mechanism in one of said directions.

2. In an airplane according to claim 1 wherein the means for positively moving either of said control surfaces includes lost motion connections between said control surfaces and said pilot operated mechanism.

3. In an airplane having swept-back wing surfaces on opposite sides of a central longitudinal plane, control surfaces pivotally mounted on said wing surfaces and movable about axes located to the rear of a transverse line through the center of gravity of the airplane and upstanding from said wing surfaces, said control surfaces having a substantially symmetrical airfoil cross section and being pivoted slightly forward of their aerodynamic center for limited free floating movement in the stream of air passing over said wing surfaces, stop means for each control surface limiting the outboard movement of the trailing portion thereof beyond a position in which the longitudinal center line of said control surface is substantially parallel with said plane while permitting free inboard movement of said trailing portion relative to its wing surface, and means for positively moving either control surface inboard of its position parallel with said plane to produce aerodynamic lift forces thereon and directionally control the airplane including pilot operated mechanism connected with said surfaces, said pilot operated mechanism including a control member and elements for positively moving either of said surfaces immediately upon movement of said control member.

4. In a tailless airplane, a main swept-back wing, floating fins of substantially symmetrical airfoil shape mounted near the lateral extremities of said wing, said fins being pivoted slightly forward of their aerodynamic centers about axes located to the rear of a transverse line through the center of gravity of the airplane and upstanding from said wing, means for imparting inherent directional stability to said airplane including said fins and cooperating stops on said wing and fins to permit inboard displacement only of the latter from a position substantially parallel to the longitudinal axis of said airplane, and means for positively directionally controlling said airplane including pilot operated mechanism for positively moving the trailing edge of one of said fins inboard of said substantially parallel position whereby aerodynamic lift forces are produced on the displaced fin to turn the airplane toward the other fin.

5. In a tailless airplane having swept-back wing surfaces on opposite sides of a longitudinal center line, rudders of airfoil cross section pivotally mounted adjacent the tips of said wing surfaces for limited movement about vertical axes located to the rear of a transverse line through the center of gravity of the airplane, said rudders normally floating about their axes in the air stream passing over said surfaces and lying parallel with the direction of flight of the airplane, cooperating stop means for each rudder, one of which means is movable with the rudder and the other of which is carried by the adjacent wing surface for arresting the outboard movement of the trailing edge of said rudder in a position in which it is substantially parallel with said center line while permitting it to move freely inboard of this position, each rudder producing lift forces when displaced relative to the airstream to impart turning movement of the airplane toward the opposite rudder, and lost motion means including a control movable in two directions for directionally controlling said airplane, interconnected with said rudders for selectively moving them inboard from their normal position substantially parallel with the direction of flight, said lost motion means including elements engaging said rudders when said control and rudders are in neutral to positively move one of said rudders inboard upon movement of said control.

6. In a tailless airplane having swept-back wing surfaces on opposite sides of a longitudinal center line, rudders of symmetrical airfoil cross section on each of said surfaces outboard of said center line, said rudders having their major plane substantially perpendicular to said upper wing surfaces and lying substantially parallel with said center line in normal forward flight of the airplane, said rudders being mounted for limited movement about vertical axes which lie near their aerodynamic centers for permitting the rudder on the forwardly moving wing surface in a yawing movement of the airplane to swing freely inwardly about its pivot relative to the airplane and remain parallel with the airstream passing over said surface, said axes being located to the rear of a transverse line through the center of gravity of the airplane, stop means for holding the rudder on the aft moving wing surface against movement about its axis when said aft moving wing is in line with or behind the other wing for creating a restoring moment about the center of gravity of the airplane tending to return the airplane to a symmetrical position relative to its direction of flight, and pilot operated means comprising, control mechanism movable in two directions, lost motion connections between said control mechanism and said rudders including elements for positively moving one of said rudders upon movement of said control mechanism in one of said directions.

7. In a tailless airplane having a main swept-back wing laterally disposed on opposite sides of a fore and aft center line, control surfaces of substantially symmetrical airfoil shape mounted slightly forward of their aerodynamic center for limited free floating movement about axes located to the rear of a transverse line through the center of gravity of the airplane and upstanding from said wing on opposite sides of said center line, said control surfaces being mounted on said wing on each side of said center line, means for selectively and positively moving the trailing portion of said control surfaces inboard from a position substantially parallel to said center line for directionally controlling said airplane including pilot operated mechanism having lost motion connections with said surfaces, and means for imparting inherent stability to the airplane in yaw when said pilot operated mechanism is held in neutral including said control surfaces and cooperating stops on said wing and said control surfaces for positively arresting the outboard movement of each of said control surfaces the trailing portion of which tends to move outboard upon a deflection of the airplane in yaw to produce a restoring moment about the center of gravity of the airplane due to aerodynamic lift forces acting on said surface.

JOHN G. LEE.

REFERENCES CITED

The following references are of record in the file of this patent:

UNITED STATES PATENTS

| Number | Name | Date |
|---|---|---|
| 1,825,609 | Wald | Sept. 29, 1931 |
| 2,390,939 | Huff | Dec. 11, 1945 |
| 2,539,357 | Wald | Jan. 23, 1951 |